United States Patent
Nishizawa et al.

(10) Patent No.: US 6,694,306 B1
(45) Date of Patent: Feb. 17, 2004

(54) SYSTEM AND METHOD FOR QUERY PROCESSING USING VIRTUAL TABLE INTERFACE

(75) Inventors: Itaru Nishizawa, Koganei (JP);
Shigekazu Inohara, Yokohama (JP);
Nobutoshi Sagawa, Koganei (JP);
Akira Shimizu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 147 days.

(21) Appl. No.: 09/665,069

(22) Filed: Sep. 19, 2000

(30) Foreign Application Priority Data

Oct. 6, 1999 (JP) ............................................. 11-285164

(51) Int. Cl.[7] ............................................... G06F 17/30
(52) U.S. Cl. ............................................. 707/3; 10/102
(58) Field of Search ............................... 707/1, 2, 3, 4, 707/5, 10, 100, 101, 102, 104.1

(56) References Cited

U.S. PATENT DOCUMENTS

| | | | |
|---|---|---|---|
| 5,590,321 A | 12/1996 | Lin et al. ..................... | 395/610 |
| 5,675,785 A | 10/1997 | Hall et al. .................... | 395/613 |
| 5,740,423 A | * 4/1998 | Logan et al. ................... | 707/1 |
| 5,806,066 A | * 9/1998 | Golshani et al. ............ | 707/100 |
| 5,812,840 A | * 9/1998 | Shwartz .......................... | 707/4 |
| 5,835,757 A | * 11/1998 | Oulid-Aissa et al. ....... | 707/100 |
| 5,873,088 A | 2/1999 | Hayashi et al. ............. | 707/100 |
| 5,908,887 A | 6/1999 | Tondre et al. ............... | 524/399 |
| 5,930,795 A | * 7/1999 | Chen et al. .................. | 707/100 |
| 5,940,818 A | * 8/1999 | Malloy et al. ............... | 707/100 |
| 6,122,627 A | * 9/2000 | Carey et al. .................... | 707/4 |

OTHER PUBLICATIONS

Kyu–Young Whang, Shamkant B. Navathe: An Extended Disjunctive Normal Form Approach for Optimizing Recursive Logic Queries in Loosely Coupled Environments. VLDB 1987: 275–287.*

ACM Computing Surveys, vol. 22, No. 3, Sep. 1990, "Federated Database Systems for Managing Distributed, Heterogeneous, and Autonomous Databases", A. Sheth et al, pp. 184–236.

The VLDB Journal, 1996, "A Predicate–based caching scheme for client–server database architectures", A. Keller et al, pp. 35–47.

Optimization for Conjunctive Queries, Chapter 14, pp. 877–911.

* cited by examiner

Primary Examiner—Diane D. Mizrahi
(74) Attorney, Agent, or Firm—Mattingly, Stanger & Malur, P.C.

(57) ABSTRACT

A query processing system in which a virtual table to enable multiple mapping to a plurality of databases is provided in a data processing system to receive a query from an application program and partial replicas as copies of part of the data in the virtual table is prepared in storage so that the whole or part of a query can be processed using the partial replicas. For query units which cannot be processed using the partial replica, means to select an appropriate distributed join method and optimization to push down query processing to real databases as far as possible are used. The system allows transparent access to multiple different real databases according to access conditions without changing the column to be accessed in the virtual table or switching the virtual table, thereby eliminating the need to create a new application for each newly developed service.

18 Claims, 14 Drawing Sheets

FIG. 2

SAVING_AVERAGE_TABLE 201

| BRANCH_OFFICE (203) | SAVING_AVERAGE (YEN) (204) |
|---|---|
| SHINJYUKU | 200,000 |
| IKEBUKURO | 185,000 |
| SHINBASHI | 190,000 |
| ---- | ---- |

CUSTOMER SAVING_BALANCE_TABLE 202

| CUSTOMER_ID (205) | BRANCH_OFFICE (206) | SAVING_AMOUNT (YEN) (207) |
|---|---|---|
| 060001895 | SHINJYUKU | 1,050,000 |
| 061089288 | IKEBUKURO | 125,000 |
| 060102952 | SHINJYUKU | 120,000 |
| ---- | ---- | ---- |

VIRTUAL_TABLE 203

| BRANCH_OFFICE (208) | SAVING_AVERAGE (YEN) (209) |
|---|---|
| SHINJYUKU | 200,000 |
| IKEBUKURO | 185,000 |
| ---- | ---- |

210 EXAMPLE OF VIRTUAL_TABLE DEFINITION

```
CREATE MAPPING VT
 (BRANCH_OFFICE CHAR (20),
 SAVING_AVERAGE INT) AS
 (SELECT BRANCH_OFFICE,
 SAVING_AVERAGE
 FROM SAVING_AVERAGE_TABLE
 MAPNAME VMAP1) |
 (SELECT BRANCH_OFFICE CHAR (20),
 AVG (SAVING_AMOUNT)
 FROM CUSTOMER_SAVING_BALANCE_TABLE,
 WHERE SAVING_AMOUNT<100,000,000
 GROUP BY BRANCH_OFFICE
 MAPNAME VMAP2);
```

FIG. 3

301 MAPPING CHANGE DESIGNATING METHODS

| # | CHANGE DESIGNATING CONDITION | |
|---|---|---|
| 1 | DATA FRESHNESS | 302 |
| 2 | DATA PRECISION | 303 |
| 3 | USER ROLE | 304 |
| 4 | APPLICATION PROGRAM | 305 |
| 5 | ACCESS LOCATION | 306 |

307 EXAMPLE OF MAPPING DESIGNATION

```
SWITCH MAPPING VT
 CASE FRESHNESS < 1day USE
 VMAP2 DEFAULT USE VMAP1;
```

422 EXAMPLE OF PARTIAL REPLICA DEFINITION

```
CREATE PARTIAL REPLICA PR1 (BRANCH_OFFICE,
  SAVING_AVERAGE) AS
SELECT BRANCH_OFFICE, SAVING_AVERAGE FROM VT
WHERE SAVING_AVERAGE>200,000
MAPNAME VMAP1;
```

601 PARTIAL REPLICA MANAGEMENT TABLE

| 602 PARTIAL REPLICA ID | 603 PARTIAL REPLICA NAME | 604 PARTIAL REPLICA COLUMN NAME | 605 VIRTUAL TABLE NAME | 606 COLUMN NAMES ON VIRTUAL TABLE | 607 MAPPING NAME | 608 PARTIAL REPLICA CREATING CONDITION |
|---|---|---|---|---|---|---|
| 1 | PR1 | BRANCH_OFFICE, SAVING_AVERAGE | VT | BRANCH OFFICE, SAVING AVERAGE | VMAP1 | SAVING_AVERAGE > 200,000 |
| 2 | ---- | ---- | ---- | ---- | ---- | ---- |

FIG. 9

QUERY 901: SELECT ic1, ic4, ic5 FROM VT1
WHERE ic2<=10 AND ic4>=10;

QUERY 902: SELECT ic1, ic5 FROM VT1 WHERE ic2<ic5;

QUERY 903: SELECT ic4, ic5 FROM VT1 WHERE
(ic2<=20 AND ic4>=990) OR
(ic2<=10 AND ic4<=10);

904:
SELECT ic4, ic5 FROM VT1 WHERE
905: (ic2<=20 OR ic2<=10) AND
906: (ic2<=20 OR ic4<=10) AND
907: (ic4>=990 OR ic2<=10) AND
908: (ic4>=990 OR ic4<=10);

FIG. 13

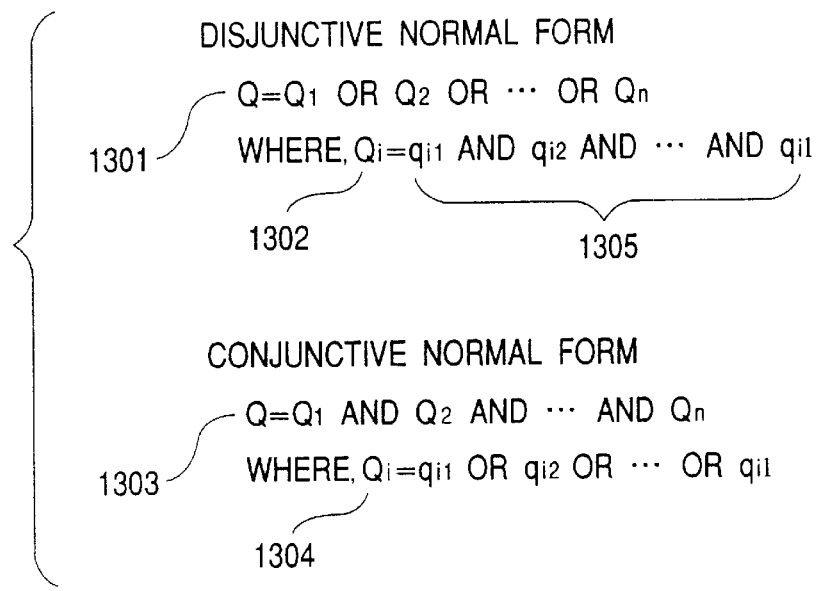

DISJUNCTIVE NORMAL FORM

1301: $Q = Q_1$ OR $Q_2$ OR $\cdots$ OR $Q_n$
WHERE, $Q_i = q_{i1}$ AND $q_{i2}$ AND $\cdots$ AND $q_{il}$ 1302, 1305

CONJUNCTIVE NORMAL FORM

1303: $Q = Q_1$ AND $Q_2$ AND $\cdots$ AND $Q_n$
WHERE, $Q_i = q_{i1}$ OR $q_{i2}$ OR $\cdots$ OR $q_{il}$

1401 DATA TYPE TRANSLATION TABLE

| 1402 DBMS NAME | 1403 VERSION | 1404 DATA TYPE NAME | 1405 DATA TYPE AVAILABLE IN DATA PROCESSING SYSTEM | 1406 FORWARD TRANSLATION PLUG-IN MODULE | 1407 REVERSE TRANSLATION PLUG-IN MODULE |
|---|---|---|---|---|---|
| 1408 DBMS_A | 5.0 | INT | INTEGER | Int_to_Integer() | Integer_to_Int() |
| 1409 DBMS_B | 8.0 | NUMBER | UDT | Number_to_UDT() | UDT_to_Number() |
| ---- | ---- | ---- | ---- | ---- | ---- |

1501 UNIVERSAL DATA TYPE

1601 VALUE TRANSLATION TABLE

| VIRTUAL TABLE NAME | VIRTUAL TABLE COLUMN NAME | VIRTUAL TABLE MAPPING NAME | REAL DATABASE COLUMN NAME | FORWARD TRANSLATION PLUG-IN MODULE | REVERSE TRANSLATION PLUG-IN MODULE |
|---|---|---|---|---|---|
| VT1 | ic3 | VMAP3 | c3 | InverseInt() | InverseInt() |
| ---- | ---- | ---- | ---- | ---- | ---- |

1608

SYSTEM AND METHOD FOR QUERY PROCESSING USING VIRTUAL TABLE INTERFACE

BACKGROUND OF THE INVENTION

1. Field of the Invention

This invention relates to data processing, particularly systems and methods for query processing which realize integrated access to a plurality of databases.

2. Description of the Prior Art

Today, with the increasing tendency towards reorganization of in-house information systems and tie-ups between companies, information systems which can cope with this rapidly changing social situation are in growing demand. Usually each company has a number of databases, each of which stores a huge volume of data in many files or tables. Such data consists of heterogeneous data created under different conditions over a long time and thus lacks consistency. Therefore, it has been pointed out that there are two problems to be solved: (1) different kinds of data have to be accessed using different applications; (2) when starting a new service or modifying a service, it is necessary to develop a new application or modify an existing application. This approach, which uses a specific application to access a specific type of data, is clearly inefficient because of the following disadvantages: since many different applications must be handled, the management task becomes more complicated; considerable cost is required in developing and maintaining applications; and sometimes a delay in service occurs due to application development time.

Methods to realize transparent access to a plurality of databases which really exist (hereinafter called "real databases") from application programs by creating virtual tables and utilize mappings from columns in the virtual tables to columns in databases in order to conceal a plurality of databases from an application programs are disclosed in U.S. Pat. No. 5,873,088, method (1) and U.S. Pat. No. 5,675,785, method (2). In method (1), logical definition of real databases is used to achieve transparent access to a plurality of databases, while in method (2), a query issued to a schema composed of virtual tables is converted to access real databases. Both the methods are characterized in that real databases are concealed and accessed from application programs using virtual tables and queries that are issued from the application programs to the virtual tables are transformed to access real databases. The approach of accessing real databases through a virtual schema, which is called database integration or schema integration, has been studied by many researchers in the academic society since around 1980. In fact, various integration methods have been proposed, as typically shown by federated database systems which have been introduced in A. Sheth and J. Larson, "Federated Database Systems for Managing Distributed, Heterogeneous, and Autonomous Databases," ACM Computer Surveys, Vol. 22, No.3, pp.183–236. All these methods use mapping from virtual schemata or virtual tables to real databases to conceal real databases from users or application programs (hereinafter called "application") for logical integration. However, this prior art has not taken the approach of assigning multiple mappings to a single virtual table and selecting one mapping among the mappings according to access conditions. The reason for this is that in the prior art, the advantage of assigning multiple heterogeneous data to one virtual table was not clear and no criteria and system for selection among assigned mappings were studied. Recently, as the need to cope with the increasing complexity and diversity of information systems has arisen, there has been a growing demand for a technique to allow a virtual table to be shared by a plurality of applications and make columns in different real databases accessible according to conditions for access from applications to the virtual table. However, conventional methods which realize a system for mapping switching as mentioned above simply by using an application, have a problem that a structurally complicated application is needed.

In constructing a large-scale corporate information system based on transparent access through virtual tables, another major problem is that realistic performance to execute service cannot be obtained. This problem is particularly evident in case that complicated queries, typically OLAP (OnLine Analytical Processing), are executed in environments where distributed query processing is done to a plurality of databases or data warehouses. In terms of data scale, there are already terabyte ($10^{12}$ bytes) order data warehouses as of July 1999; it is reported that in challenging U.S. companies, users who issue a complicated query that takes one day or more as time from query input to receive an answer are emerging. Such a complicated query contains heavy-load processing jobs like join processing of many large-scale tables. Join processing refers to a process of joining tables that frequently occurs in ad-hoc analytical query processing. If the target table is present in a different database (processing in this condition is hereinafter called distributed query processing), data transfer occurs between databases, which leads to a serious inefficiency.

There are two possible methods for improving the efficiency of distributed query processing: (1) data transfer and processing volumes are reduced by optimizing queries to push down processing jobs which individual real databases can handle, to the individual databases; and (2) data to be processed is cached and the cached data is used to omit data transfer for quicker processing. Regarding the push-down method (1), U.S. Pat. No. 5,590,321 discloses one possible approach. In this approach, query processing is pushed down to real databases holding data and capabilities necessary for query processing where each push-down takes place on a per-query basis or on a per-subquery basis. Therefore, the approach cannot be applied to complicated queries as typified by OLAP mentioned above where such push-down is possible and effective only when a query or subquery is further divided into smaller query units for each push-down. In join processing between different databases (hereinafter called "distributed join") processing volumes such as data transfer and database internal processing volumes, which affect the entire system, considerably vary depending on where and how the join processing is performed. However, conventional methods have not incorporated any means to minimize the total processing volume by properly selecting the method and location for executing said distributed join in consideration of the above-said data transfer volume or database internal processing volume.

To cache data as mentioned in method (2), there are three types of cache means: (i) cache memories as built in conventional computer systems; (ii) WEB caches, which have been studied by many researchers recently; and (iii) caches specially developed for databases. In case of (i), address-data sets are stored in a cache memory and when data at a certain address is requested, if the address is in the cache, the data corresponding to the address is returned from the cache. In case of (ii), the cache stores address-data sets, each set consisting of data and a URL (Universal Resource Locator), an address which uniquely identifies specific WEB data in the cache, and when a URL is requested, if the URL is in the cache, the data corresponding to the URL is returned from the cache. In other words, in case of (i) and (ii), a unique address which identifies specific data is given and a decision as to whether the cached data is usable or not is made only depending on whether the address is present in the cache or not. Therefore, no attention has been paid to the fact that if part of the cached data is usable for another request, the data may be usable. In analytical processing of huge volumes of data as typically seen in OLAP, analysis of huge volumes of data are performed in various ways while gradually changing conditions so that issuance of the exact same query as a previous one rarely occurs and thus it is difficult to use methods (i) and (ii) for such analytical processing.

As an example of method (iii), or a cache developed for databases, U.S. Pat. No. 5,903,887 discloses a method which caches the data to be joined to increase processing efficiency when there are many duplicated values among the target values for join at join processing. This disclosed method is applicable only to dynamic join processing but difficult to apply to ordinary queries. In "A Predicate-based Caching Scheme for Client-Server Database Architectures," The VLDB Journal, Vol.5, No.1, pp.35–47, A. Keller and J. Basu, propose a method which reduces server load and shortens query processing time by caching queries and query processing result data and using the cached data to process new queries. This method is very effective in reducing server load and shortening query processing time if query results are frequently reused. However, in an assumed environment where a plurality of large databases are connected, the size ratio of the data to be cached to the caching memory available within the data processing system would be very large, so the rate of reuse of cached data would be very low, leading to a decrease in efficiency of the entire system.

SUMMARY OF THE INVENTION

In an environment where there are many databases to store data necessary for business activity, in order to use databases, the application has to be changed depending on the type of data to be accessed. This conventional approach has a problem of increase in time and cost for creating necessary applications and managing and maintaining them. Also there has been another problem that, in distributed query processing using a plurality of databases, realistic performance required to execute query service cannot be obtained.

One object of this invention is provision of a system and method for query processing as a base for configuration of an information system capable of flexibly handling different types of data to be accessed. Another object of the invention is provision of a system to improve the performance of processing queries which require distributed query processing.

A typical embodiment of this invention is characterized in that a virtual table to enable multiple mapping to a plurality of databases is provided within the data processing system which receives queries from applications. Columns in the virtual table are mapped to columns in tables in real databases, or columns in views in real databases, or columns in another virtual table (all these are hereinafter simply referred to as columns in databases) or calculation results for these columns, and columns in the virtual table are referenced by an application and queries are issued not to columns in databases but to columns in the virtual table. This conceals access from the application to a plurality of real databases. In the data processing system according to this invention, "multiple mapping" means that one virtual table can hold several mappings whose conditions are different.

By using the multiple mapping system, the application can change the database to be accessed without changing the virtual table or the access column in the virtual table. If handling several databases involves changing the database to be accessed, native data types of each database must be handled. However, in the data processing system according to this invention, a universal data type is introduced in order to handle data types supported only by a certain real database, thereby enabling the data processing system to handle that data types. This system provides a base for the configuration of an information system which can flexibly cope with changes in the type of data to be accessed.

Another feature of the typical embodiment of this invention is that prior to query processing, a column in the virtual table or the whole or part of the calculation result for the column is stored as real data in the storage inside the data processing system or in a storage connected with the data processing system through a high speed network. The above-said stored real data is called a "partial replica." If many virtual tables exist, in order to reduce the data volume for the partial replicas for the virtual tables within the data processing system, each partial replica can be shared by many virtual tables. In said data processing system, a query to a virtual table from an application is decomposed into logically equivalent smaller query units and a decision is made for each unit as to whether the partial replica is usable or not. For a query unit for which the partial replica is usable, the partial replica is used to handle it, which results in reduction in the volume of data transfer and improvement in query processing performance. For a query unit for which the partial replica is unusable, the decomposed query unit is further transformed into a logically equivalent query unit of another type and a decision is made for each transformed query unit as to whether it can be processed using a single real database; if it can be processed using only one real database, optimization is used to push down the query processing to the real database so as to reduce the volume of data transfer and improve the performance. If join processing among several real databases, which applies a heavy load on the system, occurs, data transfer and database internal processing volumes are reduced and the performance is improved by selectively using several distributed join methods depending on the transferred data volume.

BRIEF DESCRIPTION OF THE DRAWINGS

Other objects and advantages of the invention will become apparent during the following discussion of the accompanying drawings, wherein:

FIG. 2 shows an example of virtual table definition which allows multiple mapping according to this invention;

FIG. 3 shows a mapping change designating method for a virtual table according to this invention;

FIG. 9 shows example queries for explanation of query optimization according to this invention;

FIG. 13 shows query normal forms used in query translation according to this invention;

FIG. 14 shows a data type translation table according to this invention;

DETAILED DESCRIPTION OF THE PREFERRED EMBODIMENT

Figure 1:
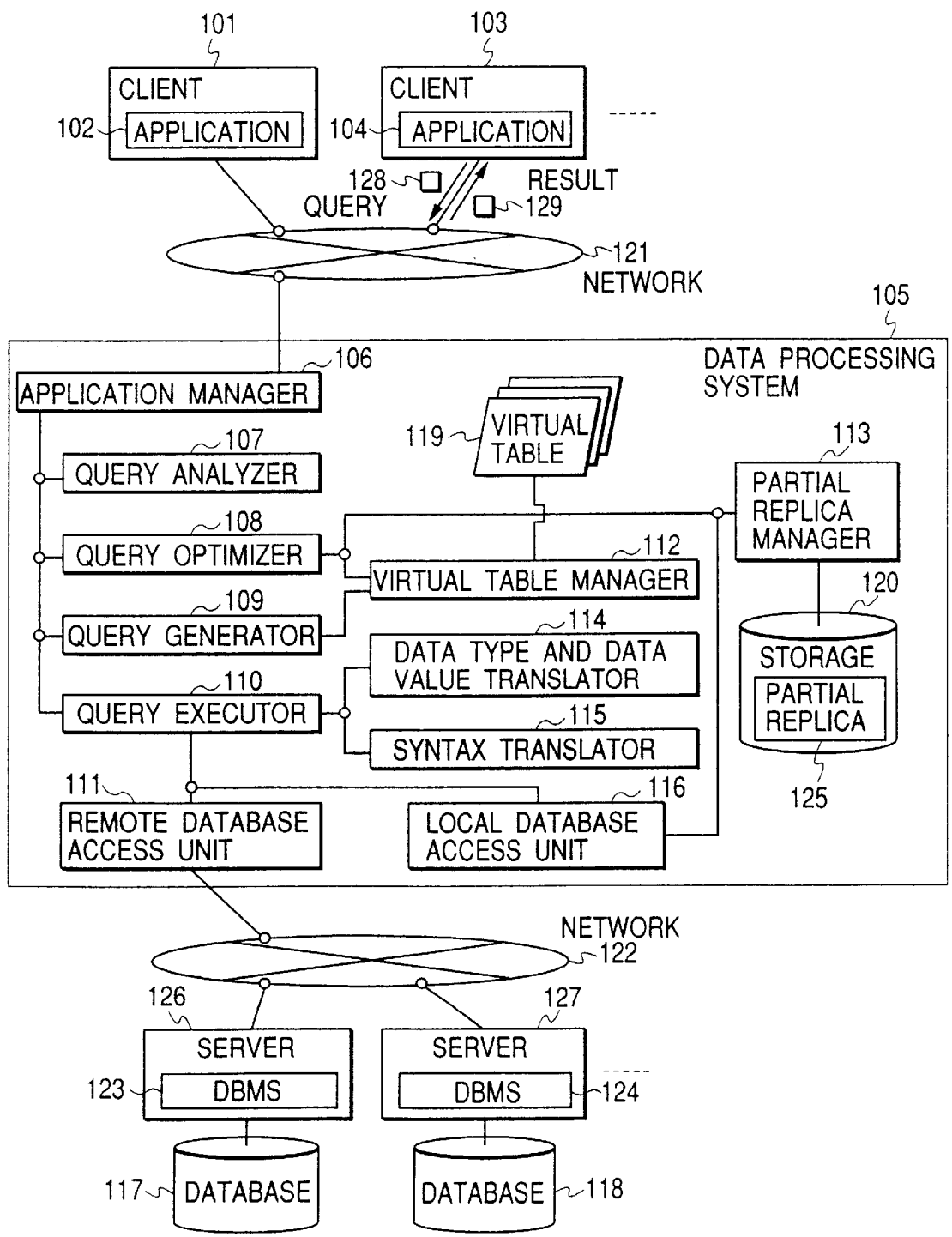
FIG. 1 shows the structure of a data processing system according to this invention.

FIG. 1 shows a preferred embodiment of a data processing system according to this invention. A client 101 which runs an application 102, and a client 103 which runs an application 104 are connected through a network 121 to a data processing system 105. The network 121 may be a local area network (LAN) using EtherNet, optical fiber or FDDI or a wide area network (WAN) including the Internet, which runs at lower speed than LAN. Clients 101 and 103 may be any type of computers referred to as personal computers or workstations. The data processing system is connected through a network 122 to servers 126 and 127 which manage real databases. Like the network 121, the network 122 may be LAN or WAN and the server 126 or 127 may be any type of computer on which database management system (DBMS) 123 or 124 runs. The DBMSs used here may be general DBMS products such as HiRDB™ from Hitachi, Ltd., Oracle8™ from Oracle Corporation or DB2™ from International Business Machine Corporation.

Here, let us assume that the application 102 issues a query 128 which references columns on a virtual table 119 in the data processing system. In this embodiment, a virtual table is a logical integration of multiple real databases and the columns in the virtual tale are mapped to the columns in multiple real databases. As an instance, FIG. 2 shows that two tables present in two real databases, a saving average table 201 and a customer saving balance table 202, are mapped to a virtual table 203. Columns in the virtual table, BRANCH_OFFICE 208 and SAVING_AVERAGE 209, are mapped to columns in two real databases: columns in the saving average table 201, BRANCH_OFFICE 203 and SAVING_AVERAGE 204; and columns in the customer saving balance table 202, BRANCH_OFFICE 206 and SAVING_AMOUNT 207 as a saving amount average by each branch office, provided that the average is calculated from the amounts of savings of customers except those with a saving balance of 100 million yen or more in the customer saving balance table. The way of mapping to the virtual table is different between the two real databases in that while the columns in the saving average table are mapped to the columns in the virtual table, the results of average calculation in the customer saving balance table are mapped to the columns in the virtual table. An example of virtual table definition based on these mappings is shown as a syntax 210. As mapping designation examples, VMAP1 as mapping of the columns in the saving average table, and VMAP2 as mapping of calculation results obtained from the customer saving balance table are defined with regard to BRANCH_OFFICE and SAVING_AVERAGE as columns in virtual table VT.

Multiple mappings thus defined are selectively used to cope with different conditions. FIG. 3 shows an example of mapping change designating method. In the mapping change designation methods 301, five examples of change designating conditions are listed. These conditions are explained next one by one.

Data freshness 302 as a mapping change designating condition is used when the data freshness required by an application on a client differs. For instance, in FIG. 2, suppose the customer saving balance table is updated upon each customer transaction and thus always held up-to-date, while a saving average table is created by totaling saving data once a day. If an application always requires the latest data, totals must be recalculated upon each request from the customer saving balance table and in this case VMAP2 must be used. On the other hand, if totals calculated on the previous day are enough for an application, access results can be more quickly obtained by using VMAP1 to access the saving average table because necessary calculations for the data to be accessed have already been made, which reduces the load on the system which is responsible for calculations. Data precision 303 is used when several databases with different precisions exist, for example, as a result of sampling, and mapping change need be done depending on the data precision requested by an application. User role 304 is used, for instance, when executives of a business as decision makers need access the latest data even if the load on the system increases while for employees who are responsible for data retrieval for customers using computer terminals in an office, to get data quickly is more important than to obtain the latest data. In the case of FIG. 2, mapping change takes place according to user role as follows: VMAP2 is used for access from executives while VMAP1 is used for access from employees. Mapping change according to application 305 looks like the above-said mapping change according to user role but the difference is that while mapping change is done to suit individual users in the latter, it is done to fit the type of task or application in the former (e.g. VMAP1 for customer-relations tasks and VMAP2 for corporate decision making simulations). Lastly, access location 306 is used in a situation as illustrated in FIG. 2: if the saving average table is present in the Tokyo office, the customer saving balance table is present in the Osaka office and the computer to run the application is installed in the Tokyo office, mapping designation is done so that VMAP1 in the Tokyo office is used due to its physically shorter distance to the computer. Mapping designation is done in the form of a syntax like an example of mapping designation 307. The example 307 represents a designation that by default VMAP is used and if data created or updated less than one day before is required or calculation on a daily basis is not sufficient, VMAP2 should be used. Examples of mapping designation using various designating conditions have been separately explained so far, but any combination of these mapping designations may be used.

In FIG. 1, the application manager 106 in the data processing system 105 receives a query issued by the application 104 as a query from a client through the network. The received query is analyzed by a query analyzer 107 and transferred to a query optimizer 108.

The query processing sequence in the data processing system is explained by reference to FIGS. 1, 11 and 13. The query optimizer transforms the received query to disjunctive normal form 1301 as shown in FIG. 13 (step 1102 in FIG. 11). "q" as elements of 1305 (FIG. 13) each represent an atomic formula. It is ensured that any formula can be transformed to said disjunctive normal form. Portion 1302, an element of the disjunctive normal form, which contains only "AND" in it, is called a partial query.

Figure 11:
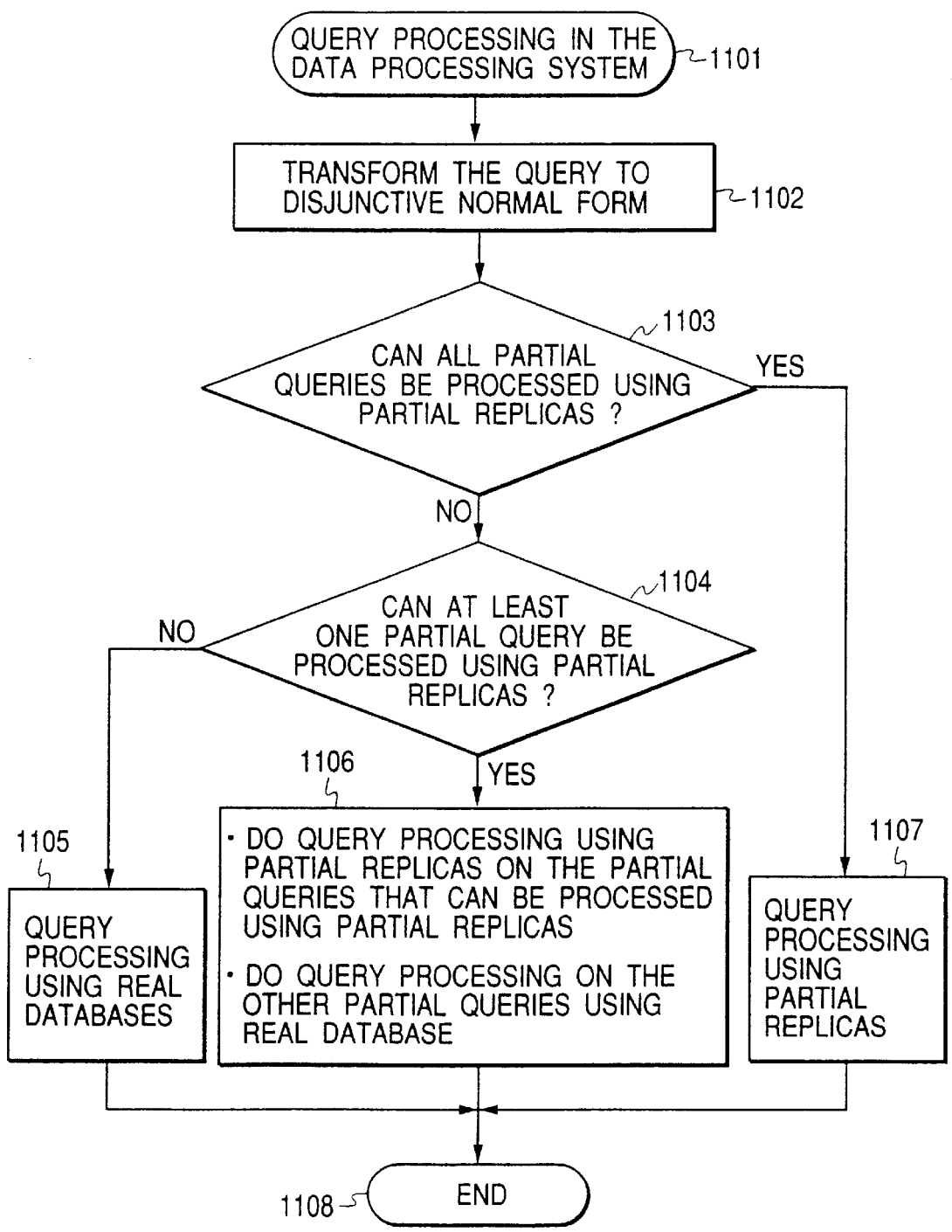
FIG. 11 is a flowchart showing the steps taken for query processing in the data processing system according to this invention.

After transforming the query to the disjunctive normal form, the query optimizer 108 in the data processing system uses the partial replica information managed by a partial replica manager 113 to judge whether partial replicas 125 stored in storage 120 of the data processing system can be used to process all partial queries (step 1103 in FIG. 11). The storage 120 may be a magnetic storage, flash memory or memory. The partial replica manager may be either one that manages partial replicas as files, or one that uses database systems to manage partial replicas as databases.

Figure 4:
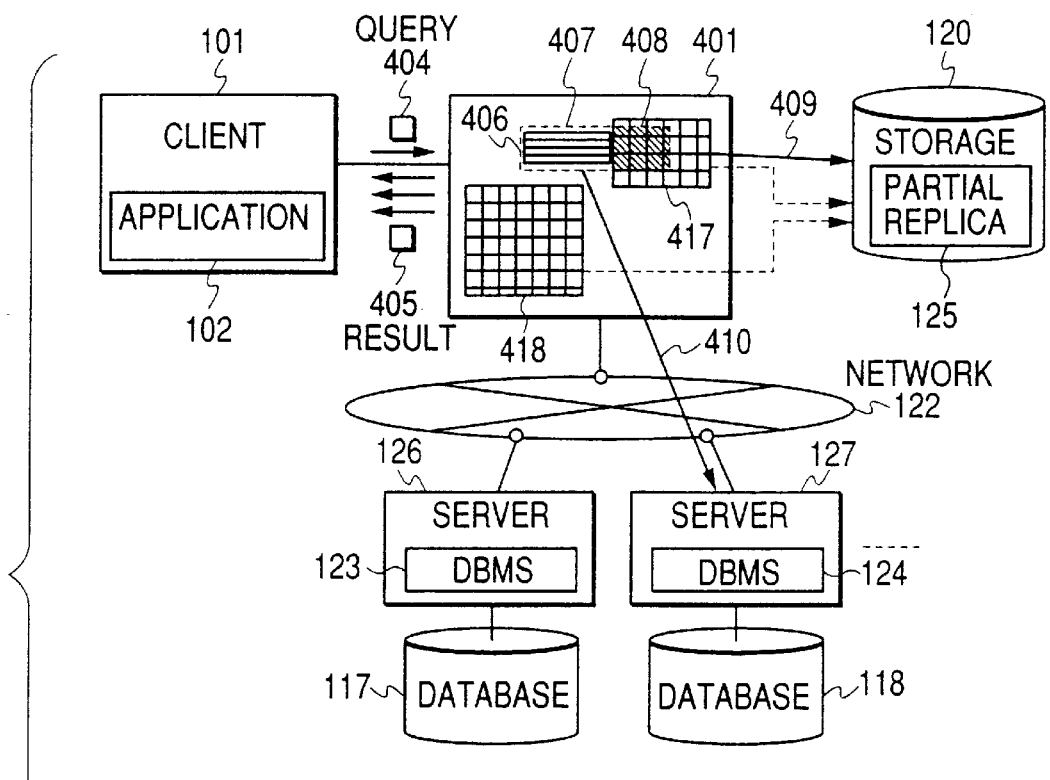
FIG. 4 shows access to a partial replica and a real database via a virtual table according to this invention.

The relations between virtual tables and partial replicas are explained next by reference to FIG. 4. Reference numeral 401 represents the range of virtual table 119 as designated by the virtual table definition. The partial replica denotes data as substantiation of part of the virtual table. In this example, areas 417 and 418 represent the ranges in which partial replica has been created, the data in these ranges is stored as partial replica 125 in storage 120. The partial replica is defined with respect to the virtual table; it can be defined by a syntax as exemplified by partial replica definition 422. This is an example that shows creation of partial replica, named PR1, for the data range where the saving average in the saving average table 201 (FIG. 2) is larger than 200,000 yen.

If all queries cannot be processed using partial replicas, partial replicas and data from real databases are combined to process them. For example, if the data in the area 406 enclosed by dotted line is needed in order to process a query 404 issued by the application 102 on the client 101, the area 406 is divided into area 408 and area 407, where the area 408 is an area for which processing is done using partial replica 125 and the area 407 is an area for which processing is done using the real database 118.

Figures 5, 6:
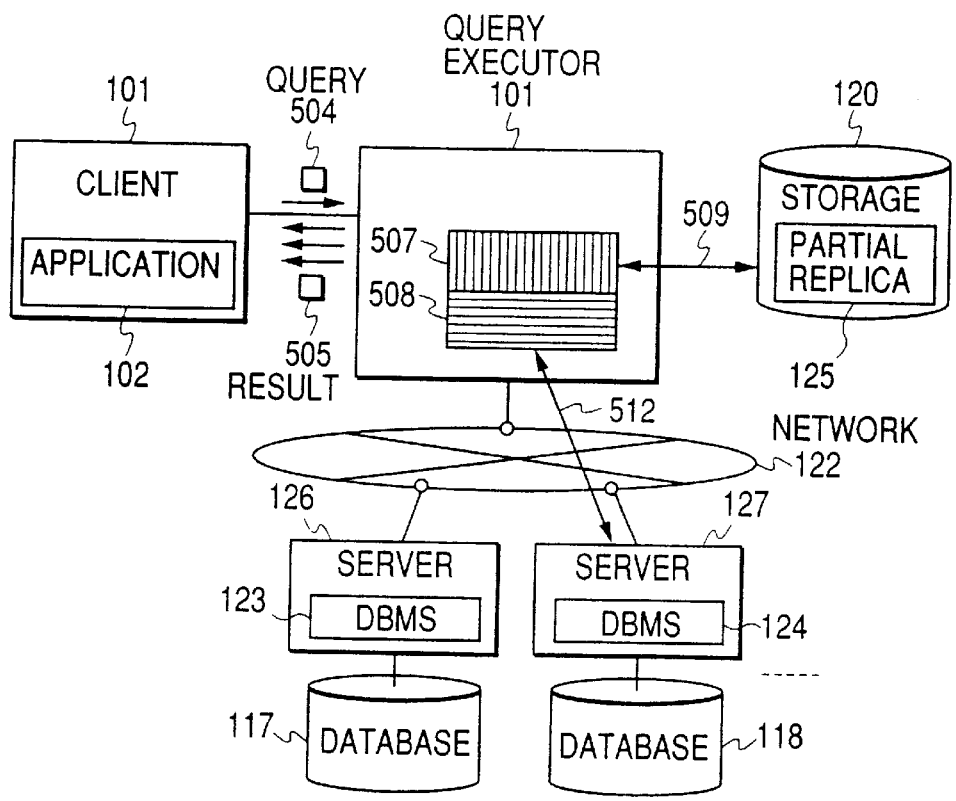
FIG. 5 shows an overview of integration of real databases and a partial replica according to this invention.
FIG. 6 is a partial replica management table according to this invention.

The partial replica manager holds not only data as partial replica but also partial replica management table 601 which manages information regarding which range of data is copied to create the partial replica (see FIG. 6). The partial replica management table includes the following columns: partial replica ID 602; partial replica name 603; partial replica column name 604 as column name for the table storing partial replica; virtual table name 605; column names on virtual table corresponding to said partial replica column names or calculation results for columns on virtual table, 606; mapping name for column names on virtual table, 607; partial replica creating condition 608. It is used to judge whether queries can be processed using partial replicas. For instance, entry 1 for the partial replica ID in the partial replica management table corresponds to partial replica definition 422 as shown in FIG. 4. The partial replica management table may be stored in storage 120 like partial replica data.

Whether partial query Qi (1302 in FIG. 13) can be processed using partial replicas is decided depending on whether all atomic formulas 1305 making up of the partial query can be processed using partial replicas.

Specifically, if partial replica which is equivalent to an atomic formula or includes the formula exists, the formula can be processed using the partial replica. Information on partial replica can be obtained by reference to the above-said partial replica management table 601. Let us assume that the partial replica definition corresponds to entry 1 under the partial replica ID column in the partial replica management table. If the query is conditioned on reference to part of the partial replica definition, or if "SELECT BRANCH_OFFICE FROM VT WHERE SAVING_AVERAGE>300,000;," the query can be processed using the partial replica. In this example, judgment as to whether it can be processed or not is made as follows, provided that the column as a choice for the SELECT clause which corresponds to "BRANCH_OFFICE" in this query is called acquisition target and the virtual table name included in the FROM clause which corresponds to "VT" in the query is called acquisition target virtual table name and the condition for data acquisition as specified in the WHERE clause which corresponds to "SAVING_AVERAGE>300,000" in the query is called acquisition condition.

First, the query text is analyzed and acquisition target, acquisition target virtual table name and acquisition condition are picked up. In this example, the acquisition target, acquisition target virtual table name and acquisition condition are "BRANCH_OFFICE," "VT" and "SAVING_AVERAGE>300,000," respectively. Then, the acquisition target is compared with column names on virtual table 606 in the above-said partial replica management table as shown in FIG. 6. In this case, since the acquisition target is included in the column names on virtual table, the result of an acquisition target column check is "accepted." Next, the acquisition target virtual table name is compared with the virtual table name 605 in said partial replica management table. In this example, since the acquisition target virtual table name is the same as the virtual table name in the partial replica management table, the result of an acquisition target virtual table name check is also "accepted." Lastly, said acquisition condition is compared with partial replica creating condition 607. In this example, since the acquisition condition is included in said partial replica creating condition, the result of a partial replica creating condition check is also "accepted." As a consequence, it is decided that the query can be processed using partial replica PR1. In this example, the replica definition and query are very simple. However, the above-said decision sequence with respect to the usability of partial replicas according to this invention is applicable to more common cases by the use of a method for examining the equivalence and containment of conditions for common cases. One such method is called "Query Equivalence, Query Containment" which is disclosed in Jeffrey D. Ullman, "PRINCIPLES OF DATABSE AND KNOWLEDGE-BASE SYSTEMS," Volume II, Computer Science Press, ISBN 0-7167-8162-X, Chapter 14 "Optimization for Conjunctive Queries" (literature 8).

If the query optimizer judges that all partial queries can be processed using partial replicas, or if "Yes" is selected at step 1103 (FIG. 11), query processing is done using partial replicas (step 1107 in FIG. 11). In this case, a query generator 109 rewrites the query so that partial replicas are referenced, and a query executor 110 executes query processing using partial replica 125 stored in storage 120 through a local database access unit 116 and the obtained data is returned as result 129 to the client through the application manager to end the query processing (step 1108). If the query optimizer judges that all queries cannot be processed using partial replicas, or if "No" is selected at step 1103, a check is made as to whether at least one partial query can be processed using partial replicas (step 1104). If no partial queries can be processed using partial replicas, or if "No" is selected at step 1104, the entire query must be processed using real databases; therefore, the query generator rewrites the partial queries into queries for which real databases are referenced, and the query executor translates the query syntax using a query syntax translator 115 as necessary, and executes query processing using real databases 117 and 118 through a remote database access unit 111 (step 1105). The data obtained from the real databases is translated to the form requested by the client as necessary using a data type and data value translator 114, and returned as result 129 to the client to end query processing (step 1108). If the query optimizer judges that at least one partial query can be processed using partial replicas, or if "Yes" is selected at step 1104, using partial replicas the query generator rewrites the partial queries which can be processed, into queries for which partial replicas are referenced, and executes query processing for the partial queries using partial replicas through the local database access unit, while it rewrites the other partial queries into ones for which real databases are referenced, and translates the query syntax as necessary using the syntax translator and executes query processing using the real databases through the remote database access unit 111; the data obtained from the real databases is translated to the form requested by the client using the data type and data value translator 114 as necessary, and the query executor integrates the data obtained from said partial replicas and the result obtained from said real databases before returning the integrated data as result 129 for query 128 to the client to end query processing.

FIG. 5 is a schematic diagram showing result integration in the case as explained above referring to FIG. 4 in which processing of a query from an application through a virtual table requires both data from partial replica and data from real databases. If processing of a query 504 from the application 102 requires both data from partial replica 125 and data from real database 118, result 507 obtained from the partial replica and result 508 from real database 118 are integrated and returned as query result 505 to the application 102.

Figure 8:
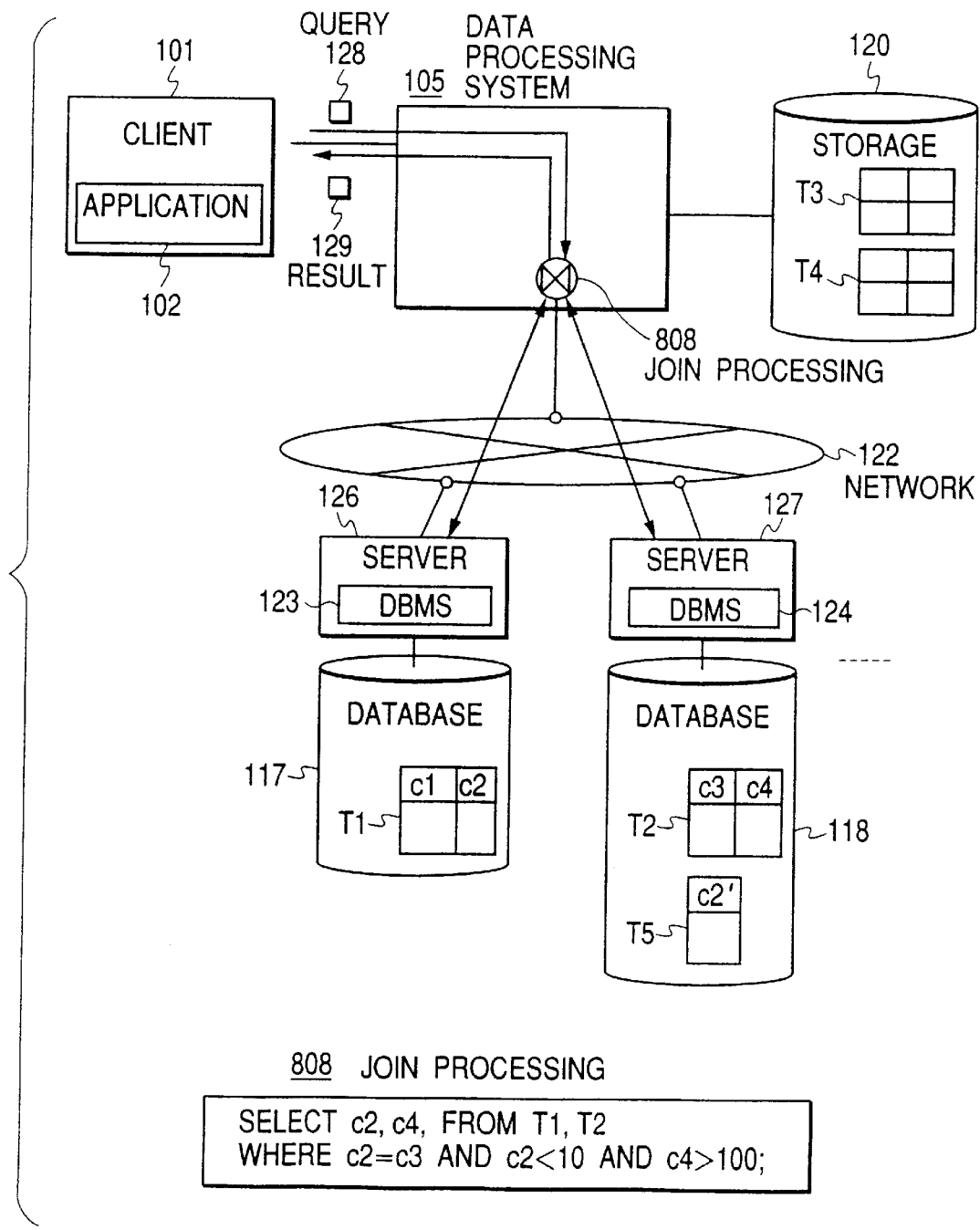
FIG. 8 is a view for explanation of join methods according to this invention.

After the usability of partial replicas is judged by the query optimizer 108, the query translated to disjunctive normal form is transferred to the query generator 109. The query generator 109 rewrites or divides the query into partial queries for reference to partial replicas and ones for reference to real databases, as mentioned above. For partial queries for reference to partial replicas, results can be obtained by sending locally rewritten partial queries to the storage 120. On the other hand, as shown in FIG. 8, there is a case that query 128 to the virtual table from the application 102 on the client 101 requires join processing 808 between real databases 117 and 118 through the network 122. In this case, an optimum execution method must be determined taking into consideration factors such as the volumes of data acquired form the databases 117 and 118, the bandwidth of the network 122, and the estimated size of join result, which leads to complexity in the processing sequence. The processing steps are described next in concrete terms using FIGS. 1, 12 and 13.

Figure 7:
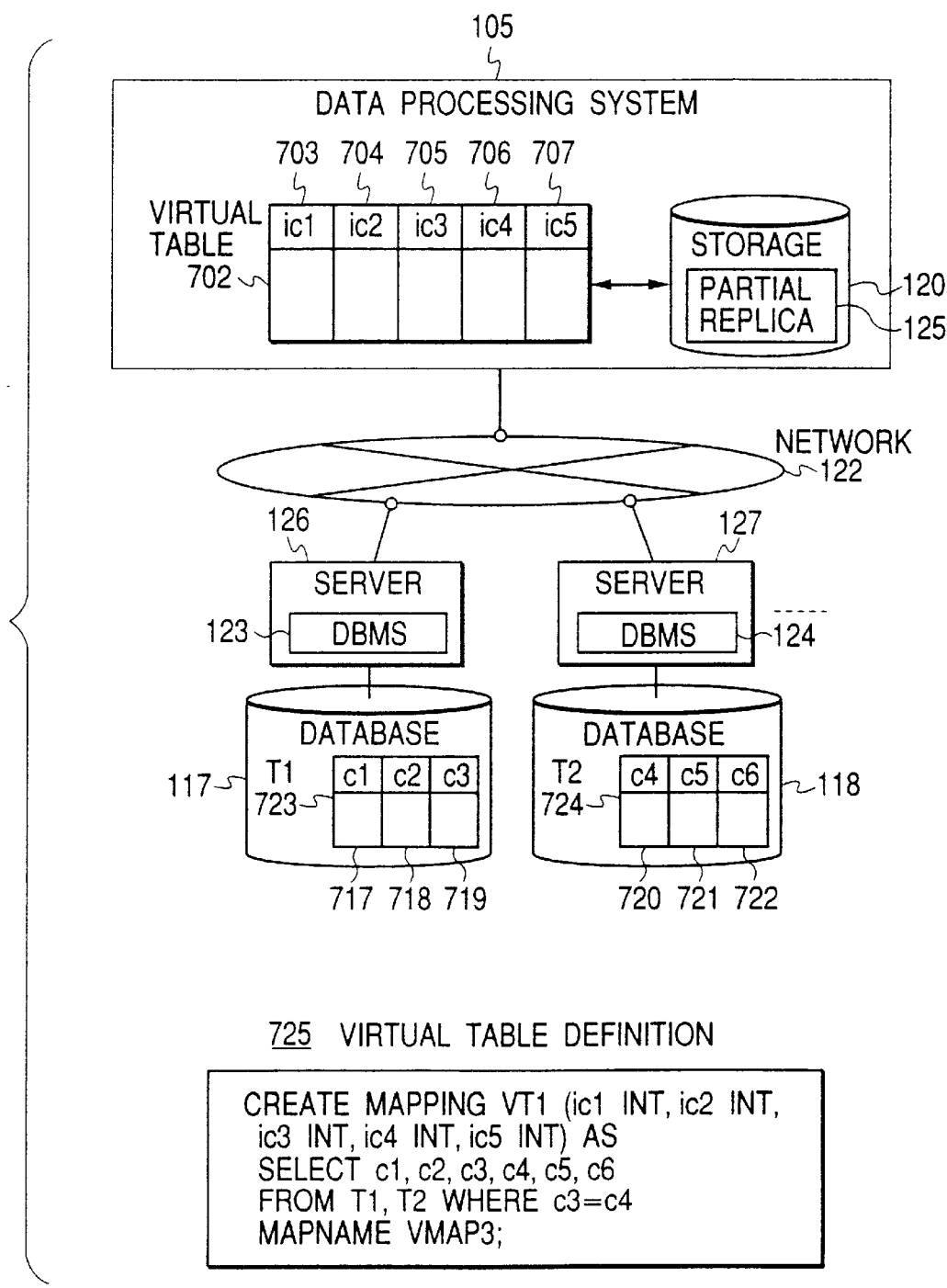
FIG. 7 shows an example of virtual table definition including join processing according to this invention.
Figure 12:
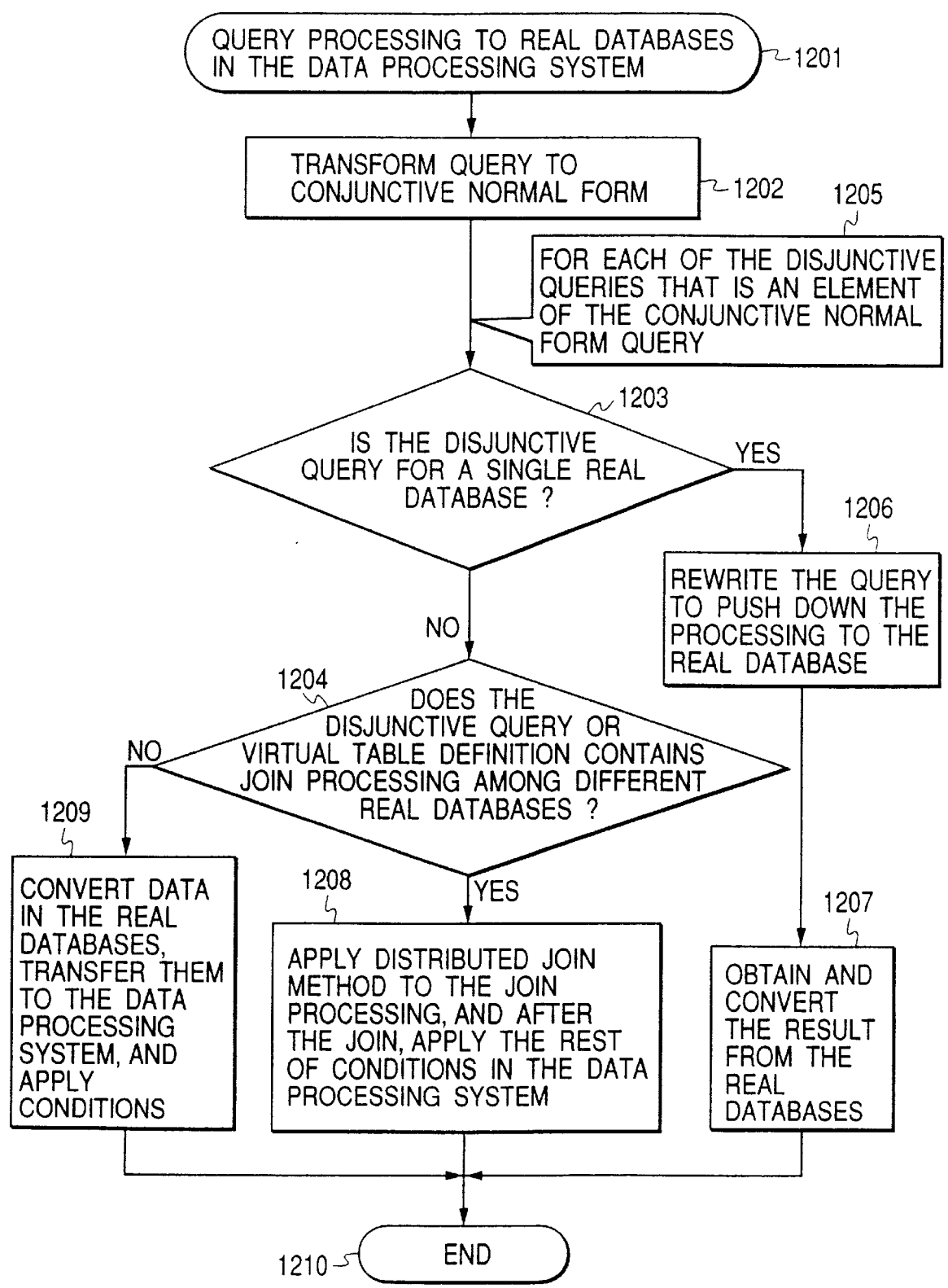
FIG. 12 is a flowchart showing the steps taken for processing of queries to real databases in the data processing system according to this invention.

The query to real databases is transformed to conjunctive normal form by the query generator (step 1202 in FIG. 12). The conjunctive normal form refers to a form that is externally ANDed and internally ORed as shown by 1303 in FIG. 13. Any formula can be transformed to conjunctive normal form as it can be transformed to disjunctive normal form. In the conjunctive normal form, internal ORed portion 1304 is called "disjunctive-query." If a disjunctive query is to reference a single real database 117, or if "Yes" is selected at step 1203, the query can be processed using only the data within the real database; so the query generator 109 rewrites the disjunctive query so as to push down the processing of the query to the real database 117. Push-down of queries is effective in reducing data transfer volumes. For example, let us assume an environment as shown in FIG. 7 in which a virtual table and real databases are present. In this environment, according to the virtual table definition 725, columns on table T1 inside database 117 connected to server 126, and those on table T2 inside database 118 connected to server 127, are both mapped to the virtual table 702. Under this condition, if query 901 as shown in FIG. 9 is issued, the two conditions, ic2<=10 and ic4>=10, can be pushed down to database 117 and database 118, respectively; in this case, the volumes of data transfer via the network would be far smaller than when the two conditions are applied after data from each database is sent to the data processing system.

Like query 901, query 903 shows a case suitable for query optimization according to this invention. In case of query 903, if the query remains in disjunctive normal form, it is impossible to judge whether its conditions can be pushed down. If the query is transformed to conjunctive normal form, it is redefined as 904. Disjunctive query 905 is conditioned on reference to ic2 only, and according to the virtual table definition 725, ic2 is mapped to c2, so the disjunctive query can be pushed down to database 117. Also, disjunctive query 908 is conditioned on reference to ic4 only, and according to said virtual table definition, ic4 is mapped to c5, so the disjunctive query can be pushed down to database 118. Although disjunctive queries 906 and 907 cannot be pushed down to databases 117 and 118, the query 904 is in conjunctive normal form and therefore the disjunctive queries 906 and 907 are processed in the data processing system using only the remaining data after the above-said pushdown of queries 905 and 908. This also contributes to reduction in data transfer volumes.

If a disjunctive query is to reference more than one real database, or if "No" is selected at step 1203 in FIG. 12, the disjunctive query cannot be processed using only one real database. In this case, the query generator checks to see if the disjunctive query or virtual table definition necessitates join processing between different real databases (step 1204 in FIG. 12). If "No" is selected at step 1204, which means that no join processing is required, the query generator transfers data from real databases to the data processing system and then generates a query for which conditions are applied, while the query executor transfers data from real databases to the data processing system, converts data as necessary and uses the storage in the data processing system to apply conditions to the collected data to produce a result and end the processing of the query to real databases (1210 in FIG. 12).

Lastly, if the disjunctive query necessitates join processing between different databases, or if "Yes" is selected at step 1204 in FIG. 12, the distributed join method is applied for join processing and, after the join, the rest of conditions are applied in the data processing system to produce a result and end the processing of the query to real databases. For instance, in case of query 902 in FIG. 9, although condition in the WHERE clause, ic2<ic5, cannot be handled using database 117 or 118 in FIG. 7 and no join processing is involved, the virtual table definition 725 contains join processing of table T1 in database 117 and table T2 in database 118 and therefore, after the distributed join method is applied for join processing of T1 and T2, the condition ic2<ic5 is applied in the data processing system.

Distributed join processing is necessary to join data in different databases as shown in FIG. 8. The explanation given below assumes that as shown in FIG. 8, table T1 in database 117 and table T2 in another database, or database 118, are joined using a distributed join method under the conditions given in 808. In the data processing system according to this invention, the following four distributed join methods are available; the query generator chooses one of the four methods depending on conditions applied, and the query executor executes the chosen method.

In the first method, join target data is transferred to the data processing system and temporarily stored in the storage connected with the system before join processing in the system. In the case as shown in FIG. 8, the data processing system receives all records which satisfy the condition of c2<10 in table T1 as join target data through the network 122, and stores the join target data in temporary table T3 in the storage 120. Similarly, all records which satisfy the condition c4>100 in T2 are transferred to the data processing system as join target data and stored in temporary table T4 in the storage before said temporary tables T3 and T4 are joined in the data processing system. This method is called "storage join." The second distributed join method is that the result obtained from a first database is embedded into a query for reference to a second database. In the case as shown in FIG. 8, the query "SELECT c2 FROM T1 WHERE c2<10;" is issued for a first database and if the values of c2 obtained as a result of the issued query are (2, 8), the query "SELECT c3, c4 FROM T2 WHERE (c3=2 OR c3=8) AND c4>100;" or "SELECT c3, c4 FROM T2 WHERE c3 in (2, 8) AND c4>100;" is generated for a second database in the data processing system; the query thus generated is issued to the second database and the obtained result is taken as join result. This method is called "OR join." The third method is as follows: like the second method, first a result is obtained from the first database and conditions are described as parameters in the query formula for the second database and join processing is performed using the result from the first database as parameter values. In the case shown in FIG. 8, assuming that the same query as used in the second method is issued to the first database and the obtained result is the same as in the second method, or (2, 8), in the third method, a query including parameter :x, "SELECT c3, c4 FROM T2 WHERE c3=:x AND c4>100;" is issued to the second database, and, given (2, 8) as the value for parameter :x, the result is obtained. This method is called "embedded parameter join." The fourth method is that the value obtained from the first database is inserted into the temporary table for the second database to perform join processing in the second database. In the case as shown in FIG. 8, like the second and third methods, the value for c2 as a result of query issued to the first database, (2, 8), is inserted into temporary table T5 in the second database, and the query "SELECT c3, c4 FROM T2, T5 WHERE c3=c2' AND c4>100;" is executed in the second database to obtain a query result. This method is called "insert join."

When the query generator chooses one of the above four distributed join methods, it carries out an applicability check and chooses the least costly method among the applicable methods. The sequence for distributed join method selection is explained below referring to FIG. 10. To check the applicability (step 1001), the above four methods are set in the execution candidate list (step 1007). Then, a check is made to see whether the data processing system can create a temporary table in the second database that stores join target data (step 1002). If it cannot create a temporary table in the second database, or if "No" is selected at step 1002, the insert join method is removed from the above-said execution candidate list (step 1003). Then, a check is made to see whether the query for the second database constructed using values that are obtained from the first database exceeds the query length limitation of the second database (step 1004). For example, SQL (Structured Query Language), an ISO-conforming language widely used as a query language in almost of all commercial relational DBMSs, usually has a limitation of its length; so if there are too many results from the first database, it would be impossible to embed all the results into SQL using OR or IN. In this way, if the query length exceeds the query length limitation, or if "Yes" is selected at step 1004, the OR join method is removed from the execution candidate list (step 1005). The costs of processing for the remaining distributed join methods in the execution candidate list are estimated and the least costly method is selected (step 1008) to end the distributed join method selection sequence (step 1006).

The cost of processing C estimated at step 1008 is calculated as the sum of data transfer cost Ct and database internal processing cost Cd, that is C=Cd+Ct. The procedure for estimation of C is described next taking an example of join processing 808 in FIG. 8. It is assumed here that A1 and A2 represent data volumes of results obtained from T1 and T2 after application of the selection conditions, respectively; L1 and L2 their line counts, respectively; Wn the bandwidth of network 122; A12 the data volume of results of join processing; L12 the line count, Cis the cost for per-line data insertion into storage 120; Cjs the join cost, Ci2 the cost for per-line data insertion in server 118; and Cj2 the join processing cost. Here, the data transfer cost in the storage join method, Ct=A1/Wn+A2/Wn can be approximated to Cd, that is the insertion cost in storage 120 plus the join processing cost: (L1×Cis+L2×Cis)+(L1×L2×Cjs). Hence, the storage join cost is expressed as C=Ct+Cd=A1/Wn+A2/Wn+(L1×Cis+L2×Cis)+(L1×L2×Cjs). By substituting the environment-dependent cost value into the result of this calculation, an approximate value of actual cost can be obtained. Regarding the OR join, embedded parameter join and insert join methods, approximate costs can be calculated in a similar way, so that the least costly method can be decided by comparison of these estimated costs. As a simpler estimation method for data transfer cost Ct, approximation with respect to the line count of result may be used.

In calculation of the cost of processing, if the internal processing method of each database is unknown and the internal processing cost Cd cannot be calculated, or if the internal processing cost calculation should be omitted for time saving, the processing cost C may be approximated using only the transfer cost Ct. This approach is useful in that as far as the data transfer cost is higher than the internal processing cost, the error is small and the calculation time can be shortened.

Figure 17:
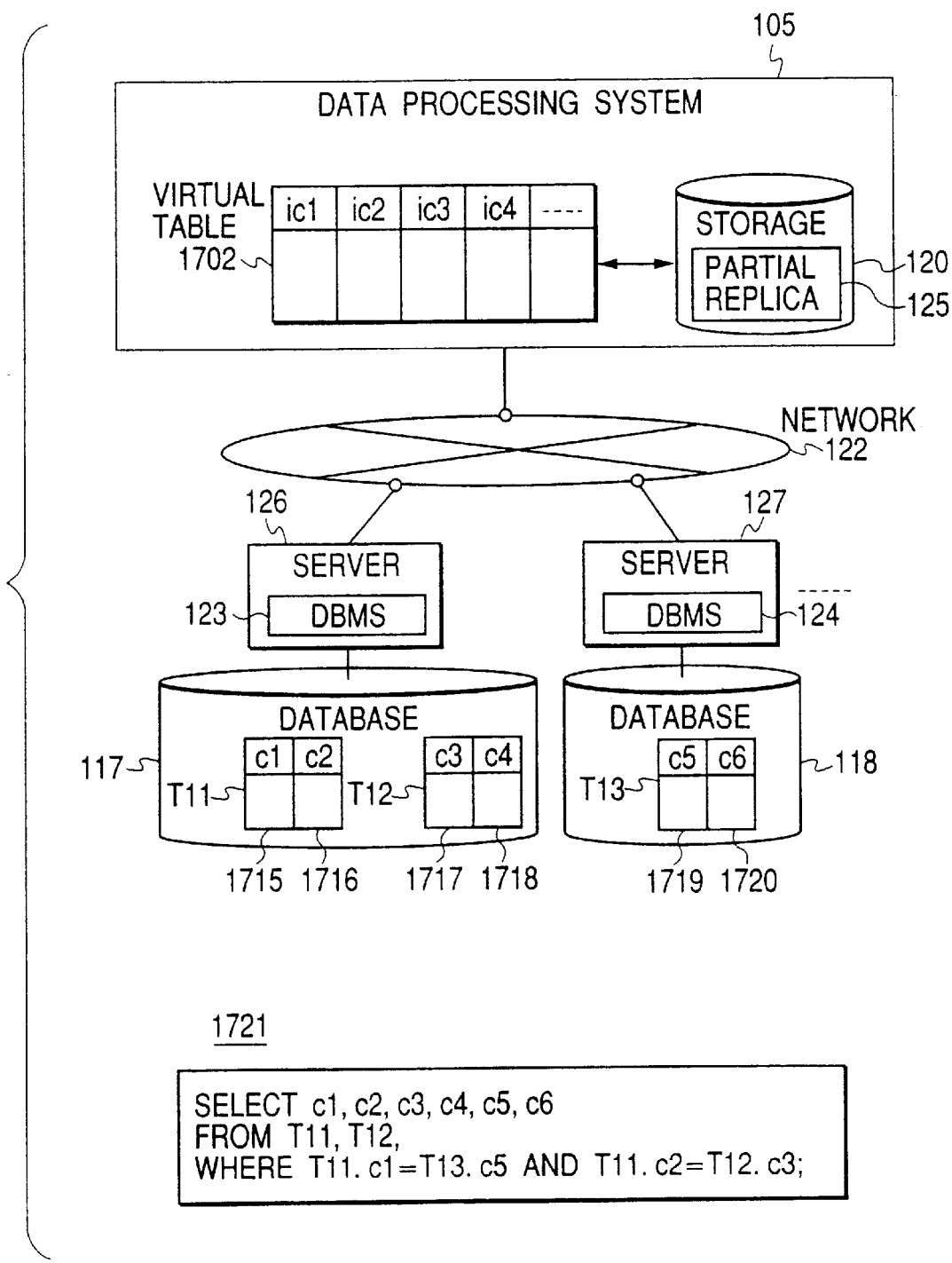
FIG. 17 shows an explanatory example of query execution method selection according to this invention.
Figure 18A:
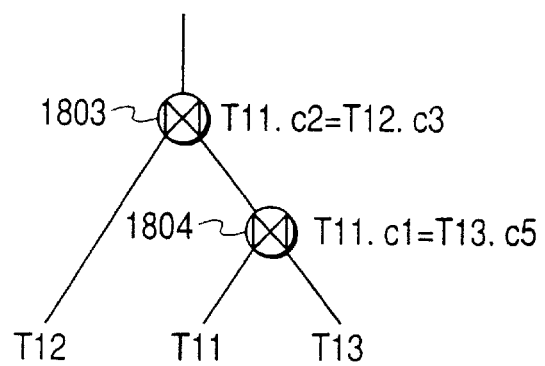
FIGS. 18A and 18B show query execution method candidates according to this invention.
Figure 18B:
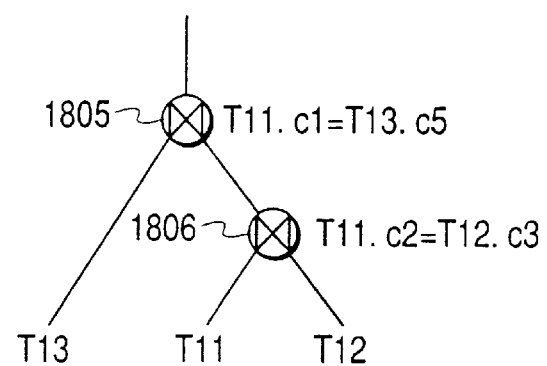

In the above embodiment, the join method selection procedures for a single join processing have been explained. However, some queries require more than one join processing. The join method selection procedures for queries requiring multiple join processings are explained next referring to FIG. 17, and FIGS. 18A and 18B. Here, it is assumed that the query issued to virtual table 1702 in data processing system 105 is transformed into a query to real databases, as defined as 1721. Since the query necessitates two join processings, taking the order of join processings into consideration, two types of query execution sequence as shown in tree diagrams FIGS. 18A and 18B are available. FIG. 18A shows that table T11 in database 117 and table T13 in database 118 in FIG. 17 are joined using the condition of T11.c1=T13.c5 (joinprocessing 1804) and then the result and table T12 in database 117 are joined using the condition of T11.c2=T12.c3 (join processing 1803).

At the first step of the query execution method selection sequence, as shown in FIGS. 18A and 18B, tree structure execution method candidates are listed. For query 1721 in this embodiment, there are two possible tree structure candidates: FIGS. 18A and 18B. For each candidate, any combination of the above-mentioned four distributed join methods may be possible. According to a simple calculation, the number of possible join method combinations for join processing 1803 and join processing 1804 is 16(=4×4). As mentioned above in the paragraph concerning distributed join method selection, for join processing, it is necessary to consider if each of the two join target tables or intermediate results should be the first table or second table, depending on the method of data transfer, so that a total of 64 types of combinations should be considered.

At the second step, candidates which cannot be executed are removed from the execution method candidates listed at the first step, as in the distributed join method selection sequence. For instance, if database 118 in FIG. 17 has no right to insertion, the insert join method which uses T13 as the second table is removed from the candidate list.

At the third step, the cost of join processing of each execution method candidate is calculated. As explained for the method of cost estimation of distributed join processing, the processing cost C may be calculated either as the sum of data transfer cost Ct and database internal processing cost Cd (Ct+Cd) or by approximation with data transfer cost Ct. Then, the sum of join processing costs is calculated and the calculated cost is made an execution method candidate cost. An example of processing cost calculation using the data transfer volume as processing cost is given referring to FIG. 18. In join processing 1804 in FIG. 18A, in order to calculate the cost in case of the insert join method being selected, if T11 in FIG. 17 is the first table and T13 the second table, the record of T11 in database 117 should be inserted into the temporary table in database 118 to execute join processing in database 118. In this case, data transfer would occur again in join processing 1803. On the other hand, if T13 is the first table and T11 is the second table, as a result of execution of the above-said insert join method, a temporary table would be generated in database 117, so that no data transfer would occur in join processing 1803. It can be, therefore, assumed that the latter procedure is less costly than the former.

At the last fourth step, the costs of various candidate execution methods calculated at step 3 are compared and the least costly candidate method is chosen. The above-said procedures indicate concrete steps for selecting the execution method for queries involving multiple join processings.

Lastly, the syntax translator 115 and the data type and data value translator 114 as shown in FIG. 1 are explained. The syntax translator performs syntax translation to suit the query syntax each DBMS uses, in case different DBMSs use different syntaxes. Specifically, the syntax translator holds a standard syntax as defined by the data processing system and a translation table to match the syntax used in each DBMS. This translation table is used to translate a syntax into one suitable for a DBMS. Regarding data type translation, as in case of syntax translation, a translation table is managed to make the data type for the data processing system match that for each DBMS; when data is transferred from a real database to the data processing system, referring to said translation table an appropriate data type translation program module is activated to perform necessary data type translation. FIG. 14 shows an example of a data type translation table as mentioned above. The data type translation table comprises the following entries: DBMS name (1402); DBMS version (1403); data type name (1404) for the DBMS concerned; data type available in data processing system (1405); forward translation plug-in module (1406) to perform data translation from a DBMS to the data processing system; and reverse translation plug-in module (1407) to perform data translation from the data processing system to a DBMS. For instance, entry 1408 means that INT type data for version 5.0 of DBMS_A is made to match INTEGER data type available in the data processing system, using plug-in Int_to_Integer( ) for forward translation and plug-in Integer_to_Int( ) for reverse translation. The query executor 110 (FIG. 1) uses these plug-ins for data translation.

Figures 15, 16:
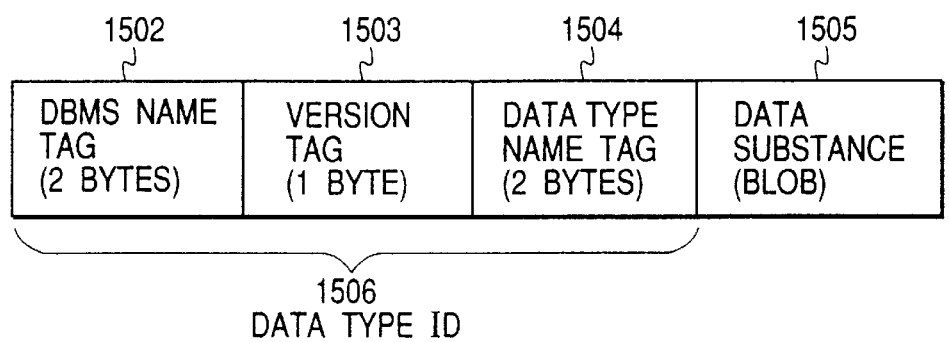
FIG. 15 shows a universal data type according to this invention.
FIG. 16 shows a value translation table according to this invention.

While entry 1408 shows a case that data type INTEGER to match DBMS_A's data type INT is present in the data processing system and thus data translation is possible, entry 1409 shows a case that no data type to match DBMS_B's data type NUMBER is present in the data processing system. A typical example of the latter case is that NUMBER is a huge integer and no data type to handle this integer properly exists in the data processing system. To handle data even in such a case, the data processing system according to this invention provides Universal Data Type 1501. As shown in FIG. 15, this universal data type comprises data type ID (1506), which is composed of DBMS name tag (e.g. 2 bytes) 1502, and version tag (e.g. 1 byte) 1503 and data type name tag (e.g. 2 bytes) 1504, and BLOB (BINARY LARGE OBJECT) 1505 which contains data itself. BLOB data type is supported by many types of DBMS including HiRDB, a DBMS from Hitachi, Ltd. Even huge integers like the one described above as NUMBER can be stored and processed in the data processing system using this universal data type.

Data value translation by the data type and data value translator is used when it is necessary to change the meanings of data values, as in a case that in join processing as shown in FIG. 7, c3 and c4 are both integers and represent sexes, but 0 denotes male, 1 female for c3, and 0 denotes female, 1 male for c4. In this case, the meanings of values must be translated. As in data type translation, the data value translator manages a value translation table 1601 as shown in FIG. 16 and uses a value translation plug-in module to perform data value translation. In FIG. 7, for column ic3 on virtual table VT1 (702), 1 denotes male and 0 female. Since this is opposite in meanings of values to the case of c3, plug-in module InverseInt( ) should be used for translation.

The explanations made so far are based on the assumption that there is one data processing system. Needless to say, however, this invention is also effective in cases where a plurality of data processing systems are interconnected through a network to exchange information. Also the above explanations seem to presume relational databases because they assume that columns to be accessed are columns on a table in a relational database. However, an object-oriented database which takes, as objects, columns to be accessed, or tugged semi-structured data may be used. Furthermore, though queries and partial replicas are defined in SQL in the above explanations, obviously this invention is effective in cases where any other equivalent language is used to describe queries and partial replicas or a tool to set internal information is used instead of such language.

Figure 10:
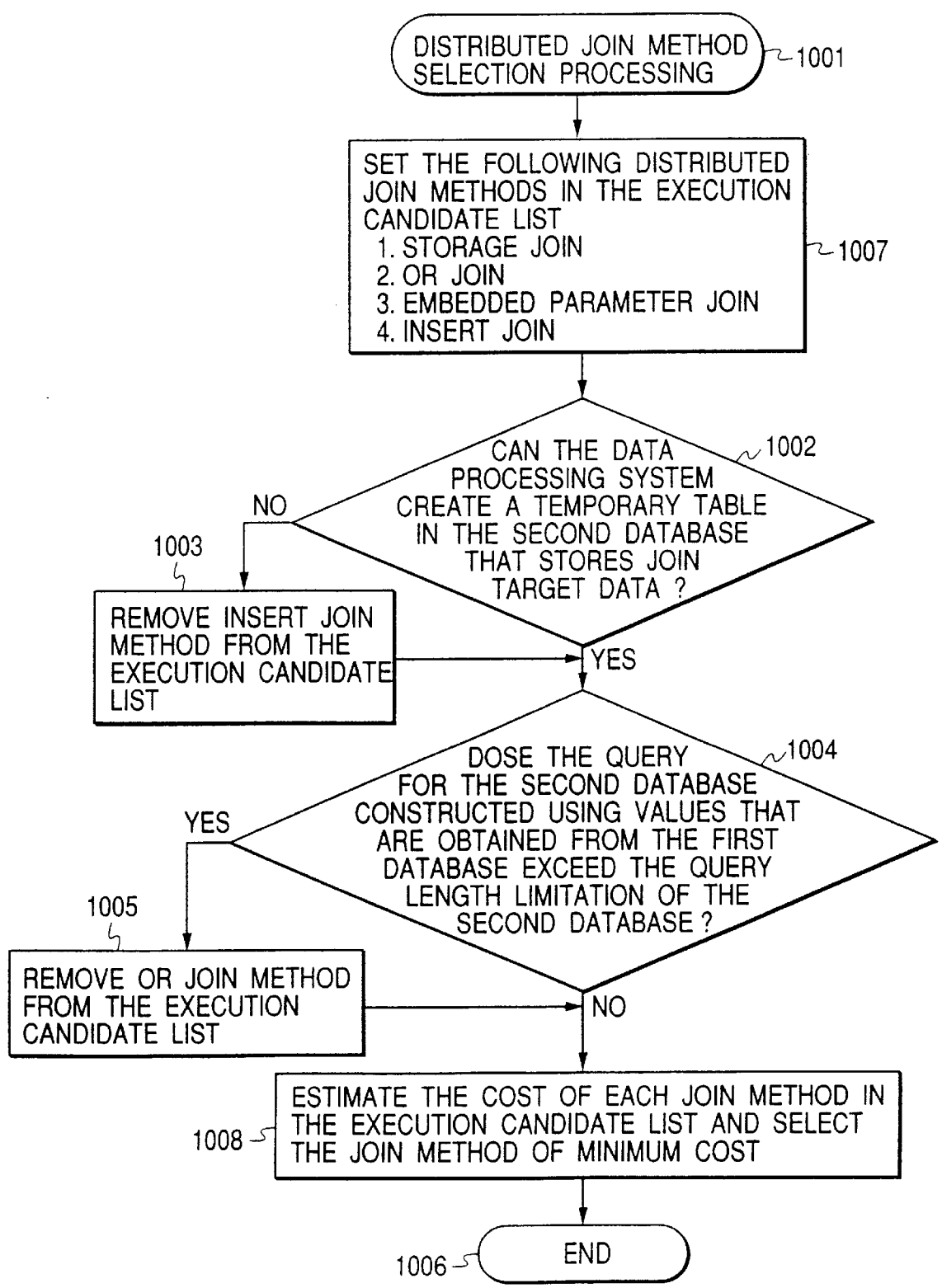
FIG. 10 is a flowchart showing the steps taken for distributed join method selection processing according to this invention.

In addition, computer programs for executing the processing sequences as shown in FIGS. 10-12 may be stored in a portable storage medium so that query processing according to this invention can be carried out in any desired place.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A query processing system connected, through a network, with at least one client to run application programs and with a plurality of servers each having at least one database, which receives a query from said client and returns the result of the query;

said query processing system having:

at least one virtual table composed of a plurality of virtual columns which contain no real data and are mapped to columns of real databases, wherein, individual names of the virtual columns are provided to said application programs and multiple mappings to different columns of different databases can be defined on each of the virtual columns;

a virtual table manager which manages said virtual table and provides each of virtual columns, on which multiple mappings are defined, with a switching designation to select one of defined mappings;

a query analyzer which analyzes said received query;

a query generator which generates a database reference query from the query analyzed by said query analyzer to reference said database using the definition of said virtual tables; and a query executor which executes processing of said database reference query generated by said query generator.

2. The query processing system as defined in claim 1, wherein said switching designation to select one of defined mappings is according to specified condition that is data freshness, data precision, user role, application program or access location, or any combination of these.

3. The query processing system as defined in claim 1, wherein said query executor has:

syntax translation means to translate the query syntax before executing database reference queries;

data type and data value translation means to transform the data type and data value as query conditions and the data type and data value obtained from said databases as a result of said translated query; and wherein said data type and data value translation means has means to store and transform data of data type proper to each database without deterioration in data precision by using a universal data type consisting of a set of data type ID and data itself.

4. The query processing system as defined in claim 1, wherein said query executor has:

syntax translation means to translate the query syntax before executing database reference queries;

data type and data value translation means to transform the data type and data value as query conditions and the data type and data value obtained from said databases as a result of said translated query; and wherein said syntax translation means and data type and data value translation means each have interface means to enable dynamic insertion of modules necessary for translation as plug-ins.

5. The query processing system as defined in claim 1, wherein said virtual table manager has interface means to define said virtual table.

6. The query processing system as defined in claim 1, wherein said virtual table manager has interface means to switch multiple mapping to said virtual table.

7. A query processing system connected, through a network, with at least one client to run application programs and with a plurality of servers each having at least one database, which receives a query from said client and returns the result of the query;

said query processing system having:

virtual tables, each being composed of a plurality of virtual columns which contain no real data and are mapped respectively to columns of real databases, wherein, individual names of the virtual columns are provided to said application programs multiple mappings to different columns of different databases or to the result of calculation for said columns can be defined on each of the virtual columns;

a virtual table manager which manages said virtual tables and provides each of virtual columns, on which multiple mappings are defined, with a switching designation to select one of defined mappings;

a partial replicas which hold columns defined in said virtual tables or the whole or part of calculation result for said columns as real data;

a partial replica manager which manages data in said partial replicas and performs data retrieval, updating, deletion or insertion;

a query analyzer which analyzes said query;

a query optimizer which judges whether it is possible to process the query analyzed by said query analyzer using said partial replicas;

a partial replica reference query generator which generates partial replica reference queries from said query to reference said partial replicas if judged possible;

a database reference query generator which generates database reference queries from said query to reference said database using the definition of said virtual table if judged not possible; and a query executor which executes at least either of said generated partial replica reference queries or said generated database reference queries.

8. The query processing system as defined in claim 7, wherein said partial replica manager has interface means to define said partial replica.

9. The query processing system as defined in claim 7, wherein said query optimizer has:

means to transform said analyzed query to disjunctive normal form;

means to judge whether it is possible to process elements of said disjunctive normal form query using said partial replicas;

means to generate a set of partial replicas required for processing elements of said disjunctive normal form query if judged possible.

10. A query processing system connected, through a network, with at least one client to run application programs and with a plurality of servers each having at least one database, which receives a query from said client and returns the result of the query;

said query processing system having:

virtual tables, each being composed of a plurality of virtual columns which contain no real data and are mapped respectively to columns of real databases, wherein, individual names of the virtual columns are provided to said application programs and multiple mappings to different columns of different databases or to the result of calculation for said columns can be defined on each of the virtual columns;

a virtual table manager which manages said virtual tables and provides each of virtual columns, on which multiple mappings are defined, with a switching designation to select one of defined mappings;

a query analyzer which analyzes said query;

a query generator which generates database reference queries from the query analyzed by said query analyzer to reference said databases using the definition of said virtual tables; and a query executor which executes processing of said database reference queries generated by said query generator, said query generator for generation of said database reference queries having:

means to transform a query to conjunctive normal form;

means to judge whether it is possible to process each of elements of said conjunctive normal form query using a single database;

means to rewrite said query so as to process it using said database if judged possible; and means to rewrite said query so as to process it using said database and data processing system if judged not possible.

11. The query processing system as defined in claim 10, wherein said means to rewrite said query so as to process it using said databases and data processing system has:

means to check the applicability of each of the following processing methods (1) through (4) for the query if it requires join processing between different databases, that is (1) a first processing method in which the respective join target data from the join target first and second databases is transferred to the data processing system and said data processing system performs join processing;

(2) a second processing method which executes join processing at the second database by using a query that incorporates the query result that is obtained from the first database;

(3) a third processing method in which query conditions are described as parameters in the query formula for the second database and the result obtained from the first database is given as parameter values to perform join processing;

(4) a fourth processing method in which the values obtained from the first database are inserted into a temporary table in the second database to perform join processing at the second database; and means to select the least costly method from among the applicable processing methods, based on processing cost calculation.

12. The query processing system as defined in claim 11, wherein said means to calculate costs of processing has means to calculate the cost of processing by the sum of required CPU time for calculation and CPU time for I/O processing.

13. The query processing system as defined in claim 11, wherein said means to calculate costs of processing by data transfer volumes.

14. The query processing system as defined in claim 10, wherein said query generator has:

means to rewrite a query so as to process it using both databases and the data processing system;

means to list several candidate query execution methods;

means to check the applicability of each of the following processing methods (1) through (4) for a query which requires more than one join processing between different databases:

(1) a first processing method in which the respective join target data from the join target first and second databases is transferred to the data processing system and said data processing system performs join processing;

(2) a second processing method which executes join processing at the second database by using a query that incorporates the query result obtained from the first database;

(3) a third processing method in which query conditions are described as parameters in the query formula for the second database and the result obtained from the first database is given as parameter values to perform join processing;

(4) a fourth processing method in which the values obtained from the first database are inserted into a temporary table in the second database to perform join processing at the second database; and means to calculate the cost of processing for each of the rest of candidate query execution methods after removing candidate query execution methods containing inapplicable formulas; and means to select as the execution method the method with minimum processing cost from among the applicable processing methods.

15. A query processing method in which a query to be executed in a data processing system connected, through a network, with at least one client to run application programs and with a plurality of servers each having at least one database to reference said database according to access requests, is received from said client, and the result of execution of the query is returned to said client;

said query processing method having:

a process to analyze the received query;

a process to generate database reference queries from said analyzed query to reference said databases using the definition of a virtual table composed of a plurality of virtual columns which contain no real data and are mapped respectively to columns of real databases, wherein, individual names of the virtual columns are provided to said application programs and multiple mappings to different columns of different databases or to the result of calculation for said columns can be defined on each of the virtual columns; and a process to execute the generated queries.

16. A storage medium which records a computer program to execute one of the methods as defined in claim 15 using a computer.

17. A query processing method in which a query to be executed in a data processing system connected, through a network, with at least one client to run application programs, and with a plurality of servers each having at least one database to reference said database according to access requests, is received from said client, and the result of execution of the query is returned to said client;

said query processing method having:

a process to analyze the received query;

a process to generate database reference queries from the analyzed query to reference said databases using the definition of a virtual table composed of a plurality of virtual columns which contain no real data and are mapped respectively to columns of real databases, wherein, individual names of the virtual columns are provided to said application programs and multiple mappings to different columns of different databases or to the result of calculation for said columns can be defined on each of the virtual columns;

a process to generate partial replica reference queries to reference partial replicas which hold columns defined in said virtual table or the whole or part of calculation result for said columns as real data;

a process to judge whether it is possible to process said analyzed query using said partial replicas;

a process to execute at least said partial replica reference queries if judged possible; and a process to execute said database reference queries if judged not possible.

18. A query processing method in which a query to be executed in a data processing system connected, through a network, with at least one client to run an application and with a plurality of servers each having at least one database to reference said database according to access requests, is received from said client, and the result of execution of the query is returned to said client;

said query processing method having:

a process to generate database reference queries to reference said databases using the definition of a virtual table composed of a plurality of virtual columns which contain no real data and are mapped respectively to columns of real databases, wherein, individual names of the virtual columns are provided to said application programs and multiple mappings to different columns of different databases or to the result of calculation for said columns can be defined on each of the virtual columns; and a process to execute the generated database reference query, said process to generate a database reference query having:

a process to transform a generated query to conjunctive normal form;

a process to judge whether it is possible to process each of query elements of said conjunctive normal form query using a single database;

a process to rewrite said query so as to process it using said database if judged possible; and a process to rewrite said query so as to process it using said database and data processing system if judged not possible.

* * * * *